United States Patent
Pilon

(10) Patent No.: US 10,332,429 B2
(45) Date of Patent: Jun. 25, 2019

(54) LABELLING SYSTEM FOR RACKMOUNT CASE FOR THE ACCOMMODATION OF OPTICAL EQUIPMENT

(71) Applicant: BELDEN CANADA INC., Saint-Laurent (CA)

(72) Inventor: Vincent Pilon, Lachine (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

(21) Appl. No.: 15/641,810

(22) Filed: Jul. 5, 2017

(65) Prior Publication Data

US 2018/0012523 A1    Jan. 11, 2018

Related U.S. Application Data

(60) Provisional application No. 62/358,753, filed on Jul. 6, 2016.

(51) Int. Cl.
| | |
|---|---|
| G02B 6/44 | (2006.01) |
| G09F 3/12 | (2006.01) |
| G09F 7/22 | (2006.01) |
| G09F 3/00 | (2006.01) |
| G09F 7/18 | (2006.01) |

(52) U.S. Cl.
CPC ............... *G09F 3/12* (2013.01); *G02B 6/445* (2013.01); *G02B 6/4453* (2013.01); *G09F 3/0297* (2013.01); *G09F 7/18* (2013.01); *G09F 2007/1856* (2013.01)

(58) Field of Classification Search
None
See application file for complete search history.

(56) References Cited

U.S. PATENT DOCUMENTS

| | | | | |
|---|---|---|---|---|
| 5,080,607 | A * | 1/1992 | Cristescu ............. | H01R 9/2683 439/491 |
| 5,898,129 | A * | 4/1999 | Ott ....................... | G02B 6/4452 174/59 |
| 6,175,079 | B1 * | 1/2001 | Johnston .............. | G02B 6/4452 174/50 |
| 7,102,884 | B2 * | 9/2006 | Mertesdorf .......... | G02B 6/4452 361/679.4 |
| 2004/0165851 | A1 * | 8/2004 | Daoud ................. | G02B 6/4452 385/135 |
| 2005/0111810 | A1 * | 5/2005 | Giraud ................. | G02B 6/4452 385/135 |

(Continued)

*Primary Examiner* — Michelle R Connelly
(74) *Attorney, Agent, or Firm* — Hugh Mansfield

(57) ABSTRACT

A rackmount case for the accommodation of optical equipment and labelling tag is disclosed. The case comprises a box like housing comprising an end defining a rectangular opening, labelling tags each comprising a rectangular tag plate and a plurality of hinge elements arranged along an edge of the rectangular tag plate. At least one labelling tag receiving slot is within the housing for receiving one of the labelling tags. The slot comprises an opening adjacent the housing opening and a plurality of hinge elements adjacent the slot opening. The labelling tags are moveable between a first position, wherein the tags are held within the slot, and a second position wherein the tags are outside of the slot and each of the hinge elements is engaged by a respective of the second hinge elements such that the tags are rotatable about an axis in parallel to the slot opening.

18 Claims, 12 Drawing Sheets

(56) References Cited

U.S. PATENT DOCUMENTS

| | | | |
|---|---|---|---|
| 2009/0194226 A1* | 8/2009 | Tabet | H04Q 1/13 156/230 |
| 2009/0245746 A1* | 10/2009 | Krampotich | G02B 6/4452 385/135 |
| 2012/0288249 A1* | 11/2012 | Ruiz | H04Q 1/02 385/135 |
| 2015/0060539 A1* | 3/2015 | Thompson | G02B 6/3895 235/375 |
| 2015/0289033 A1* | 10/2015 | Ruiz | H04Q 1/02 385/135 |
| 2016/0309606 A1* | 10/2016 | Anderson | G02B 6/4452 |

* cited by examiner

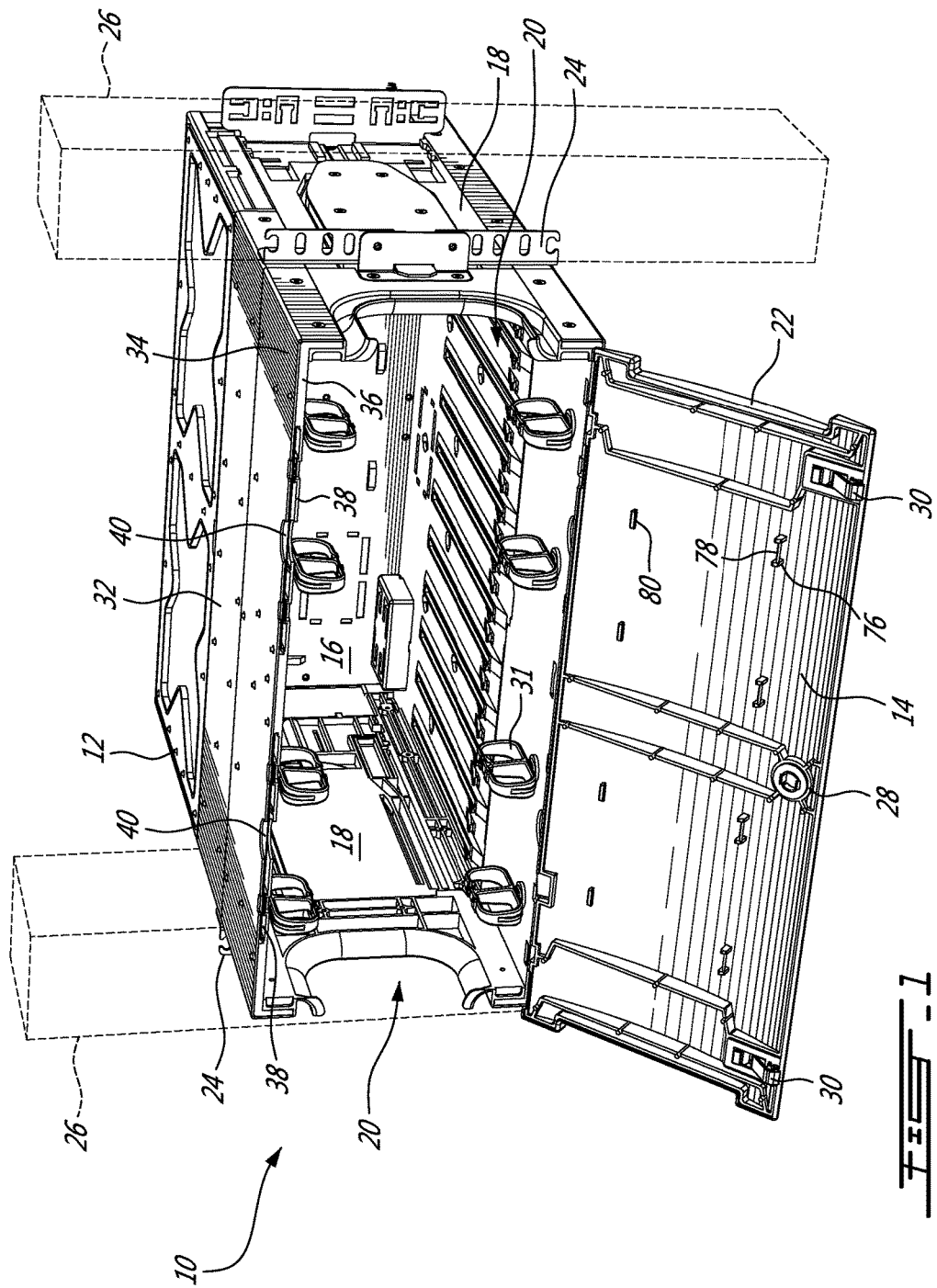

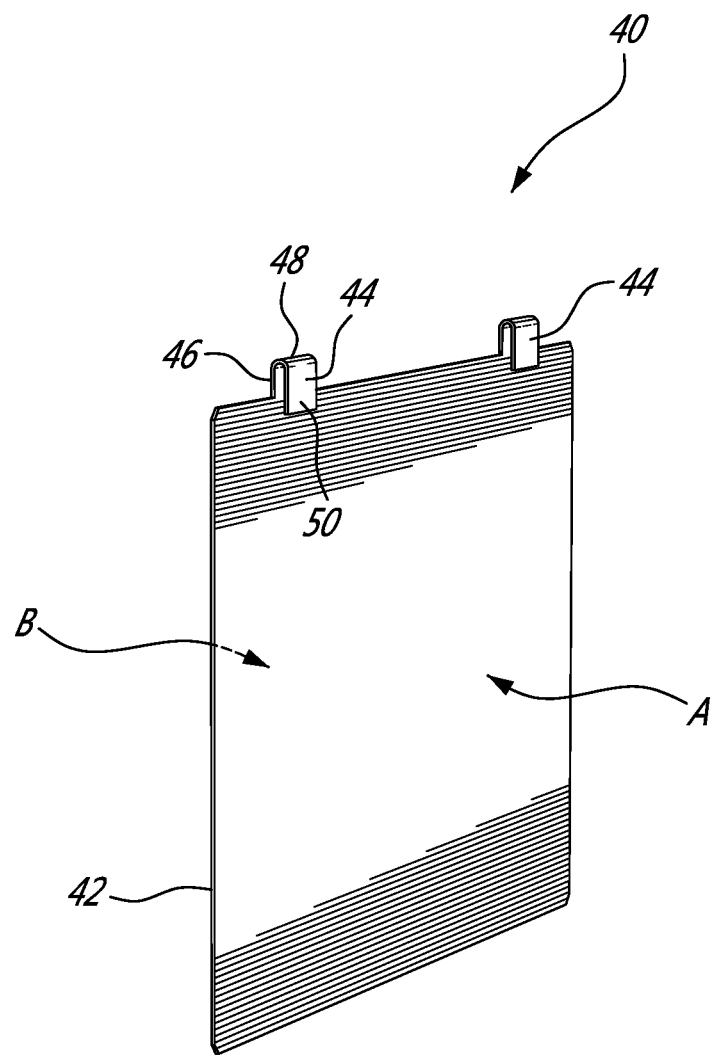

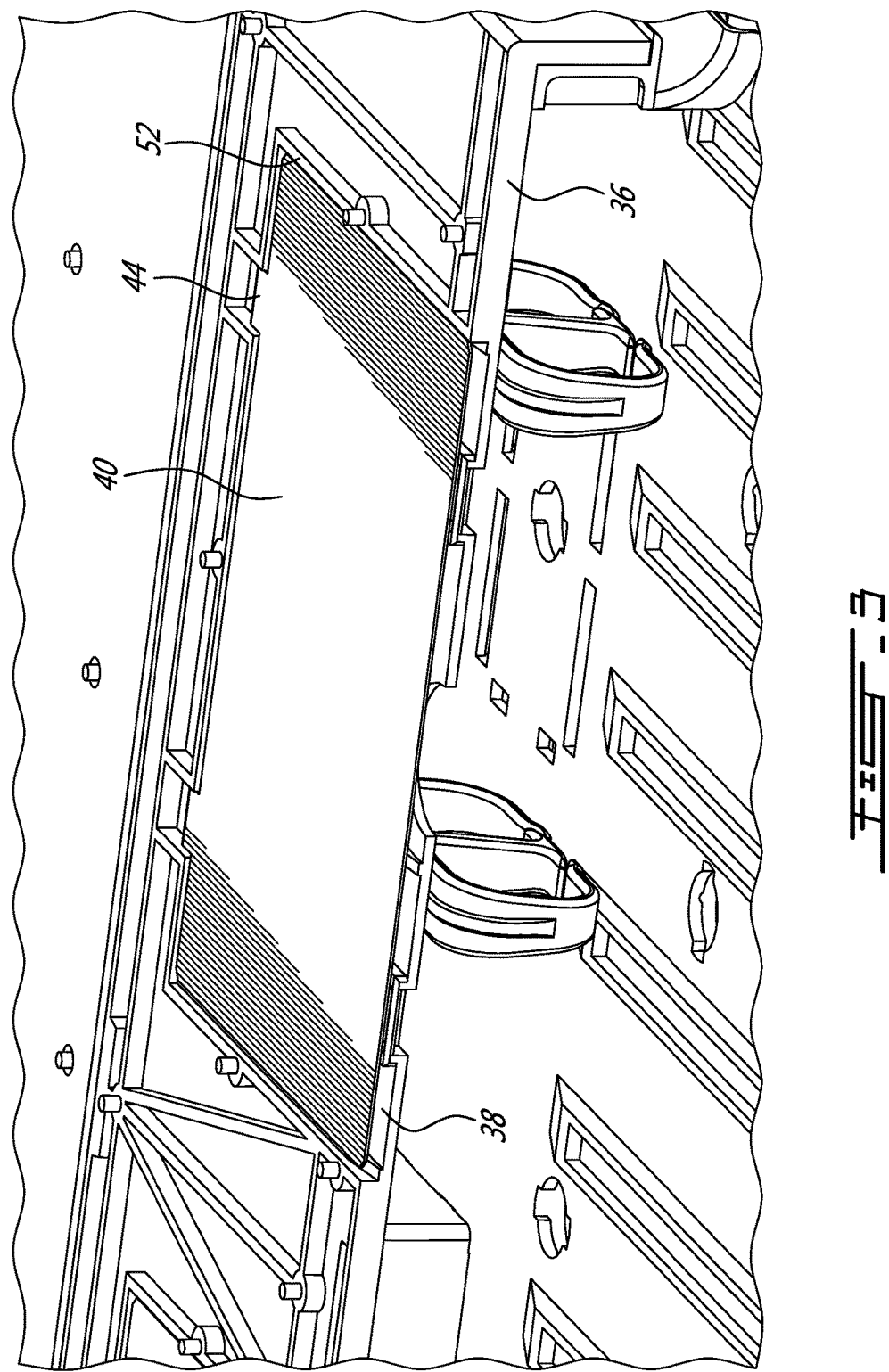

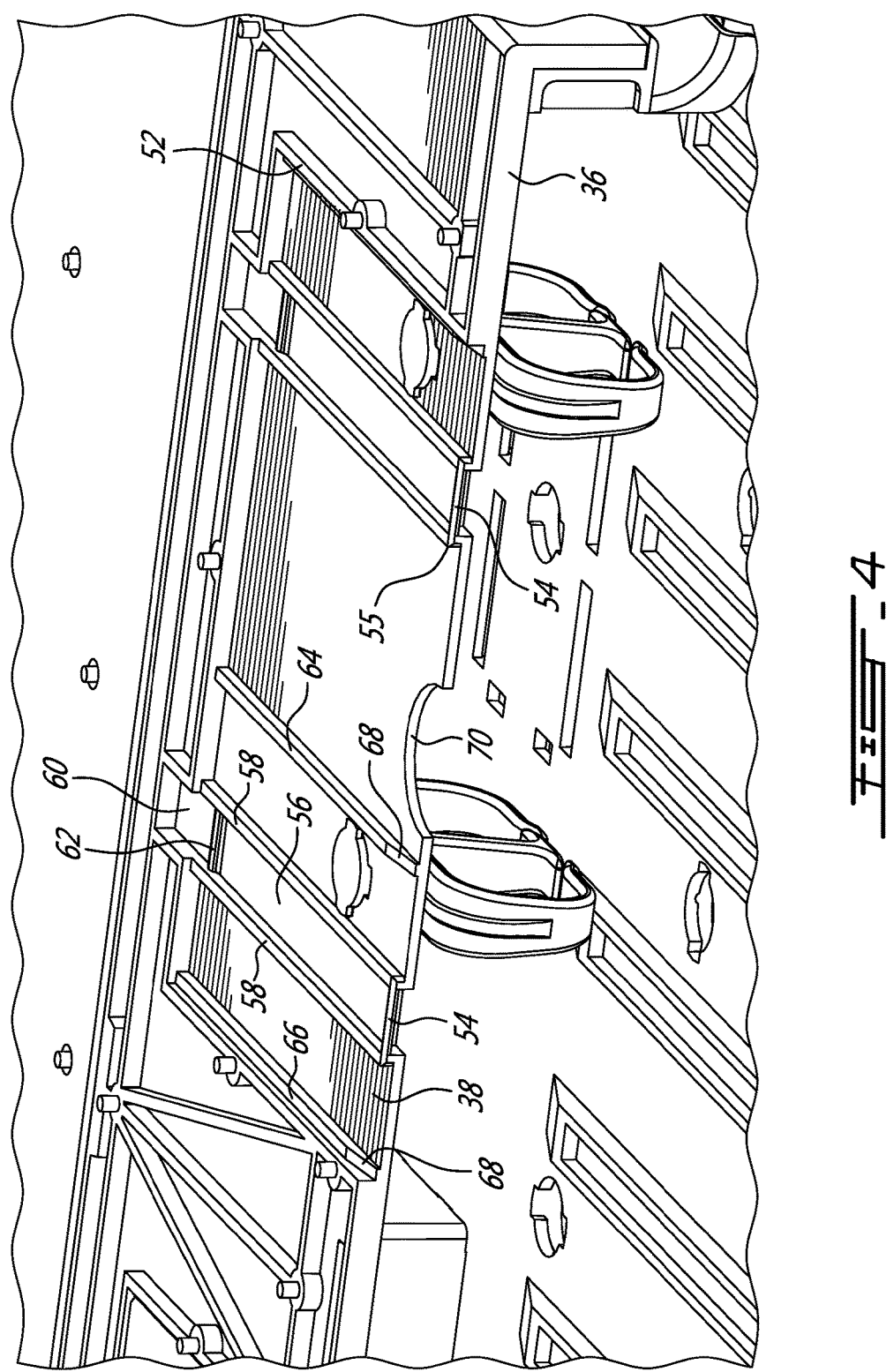

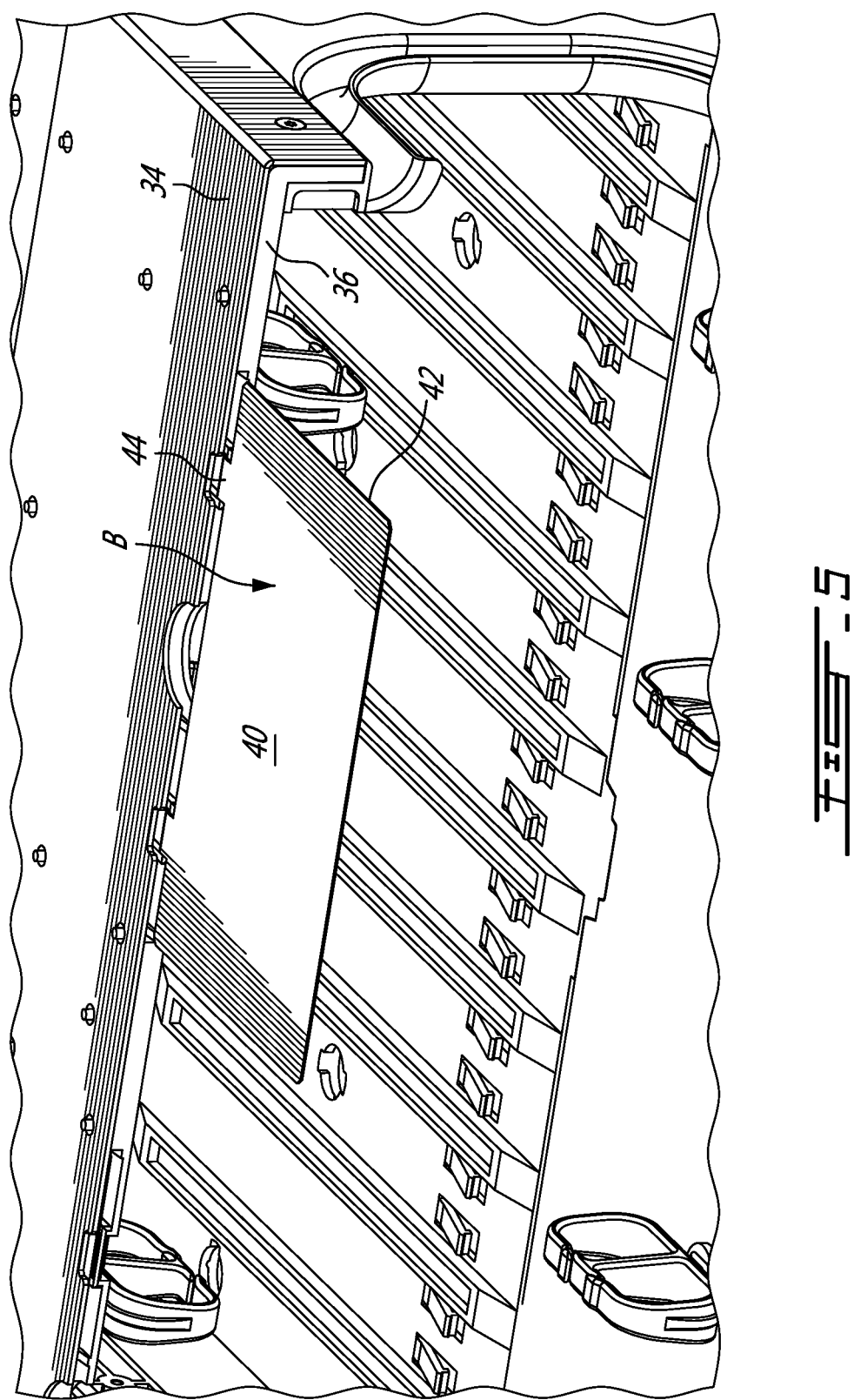

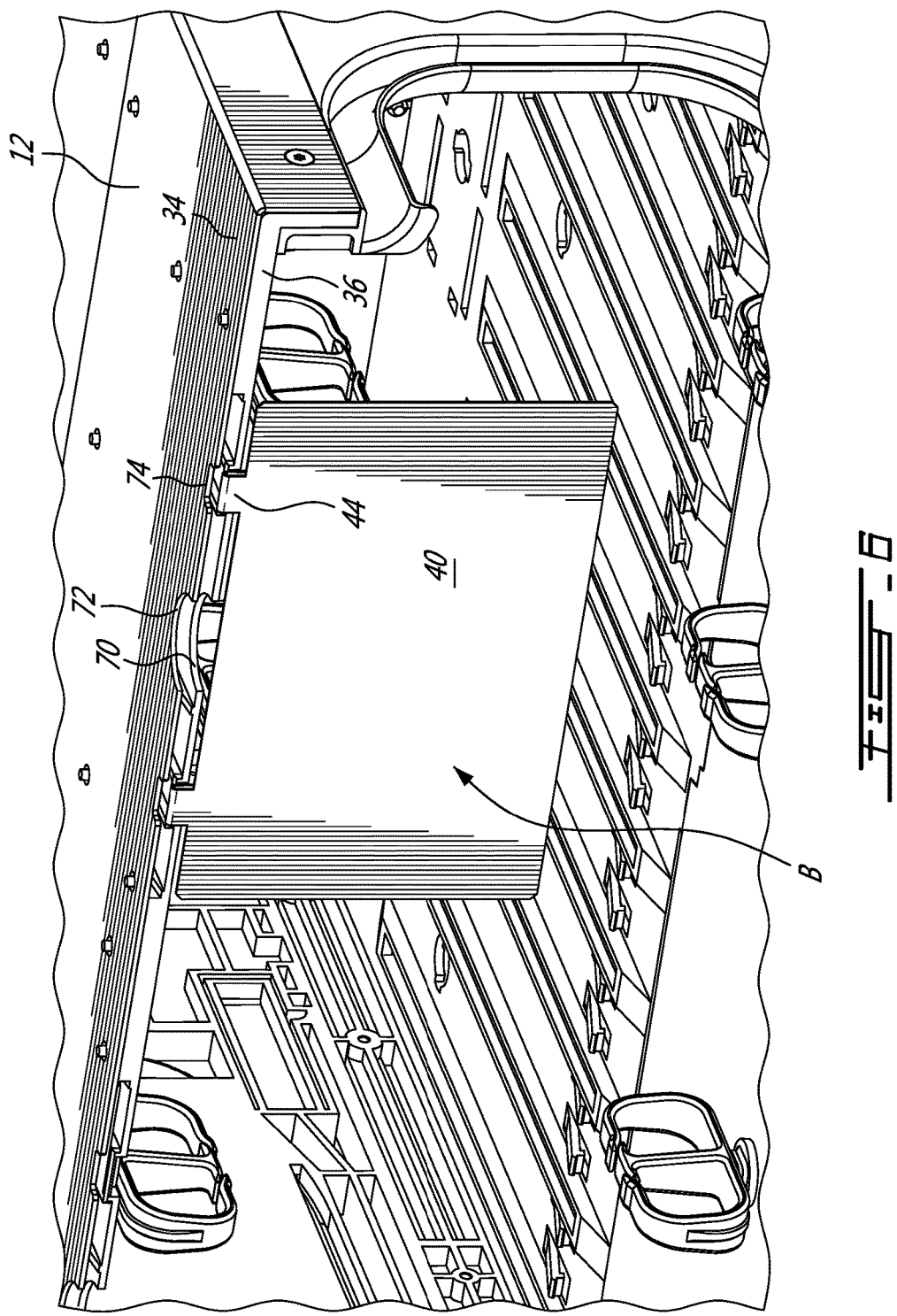

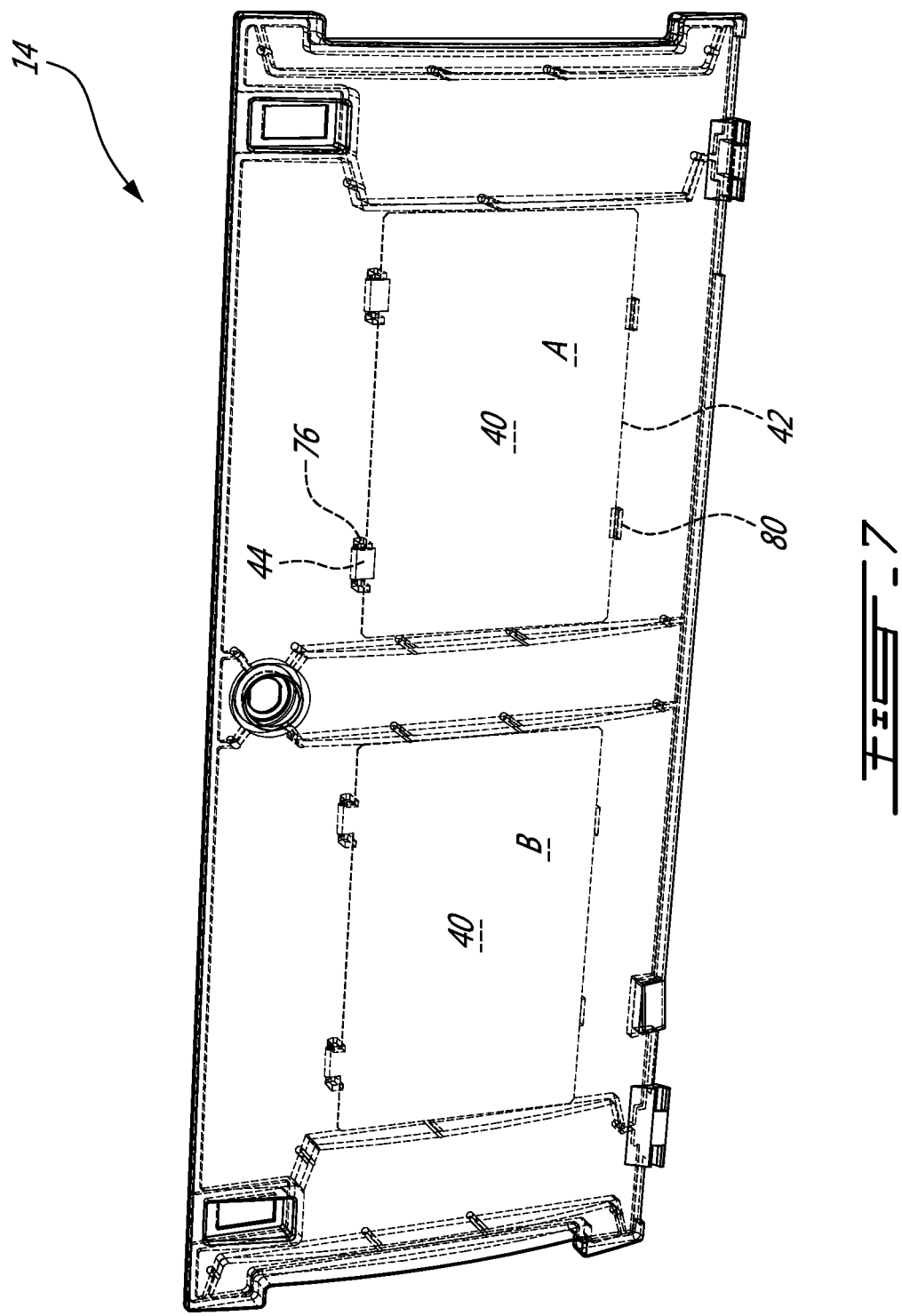

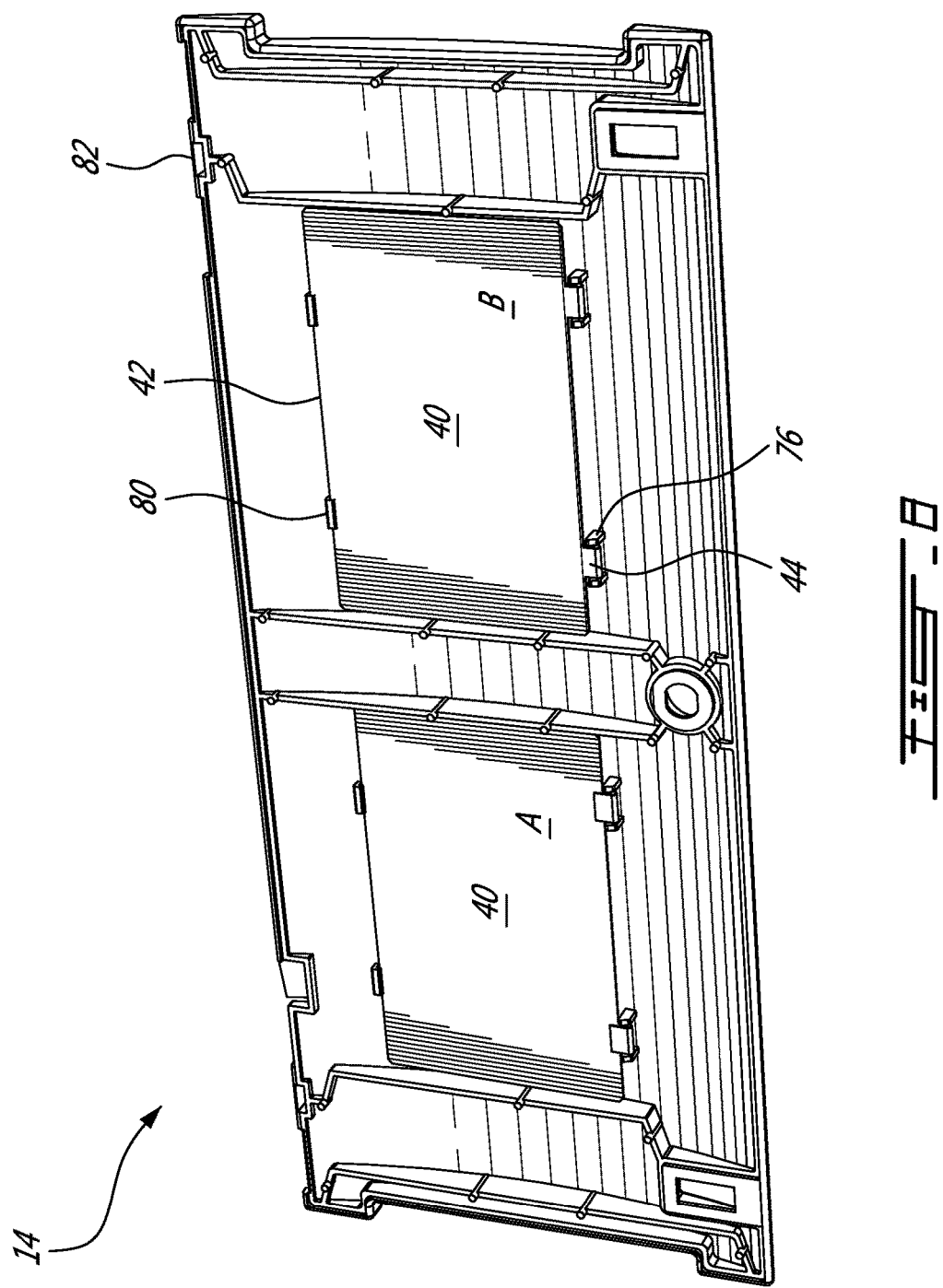

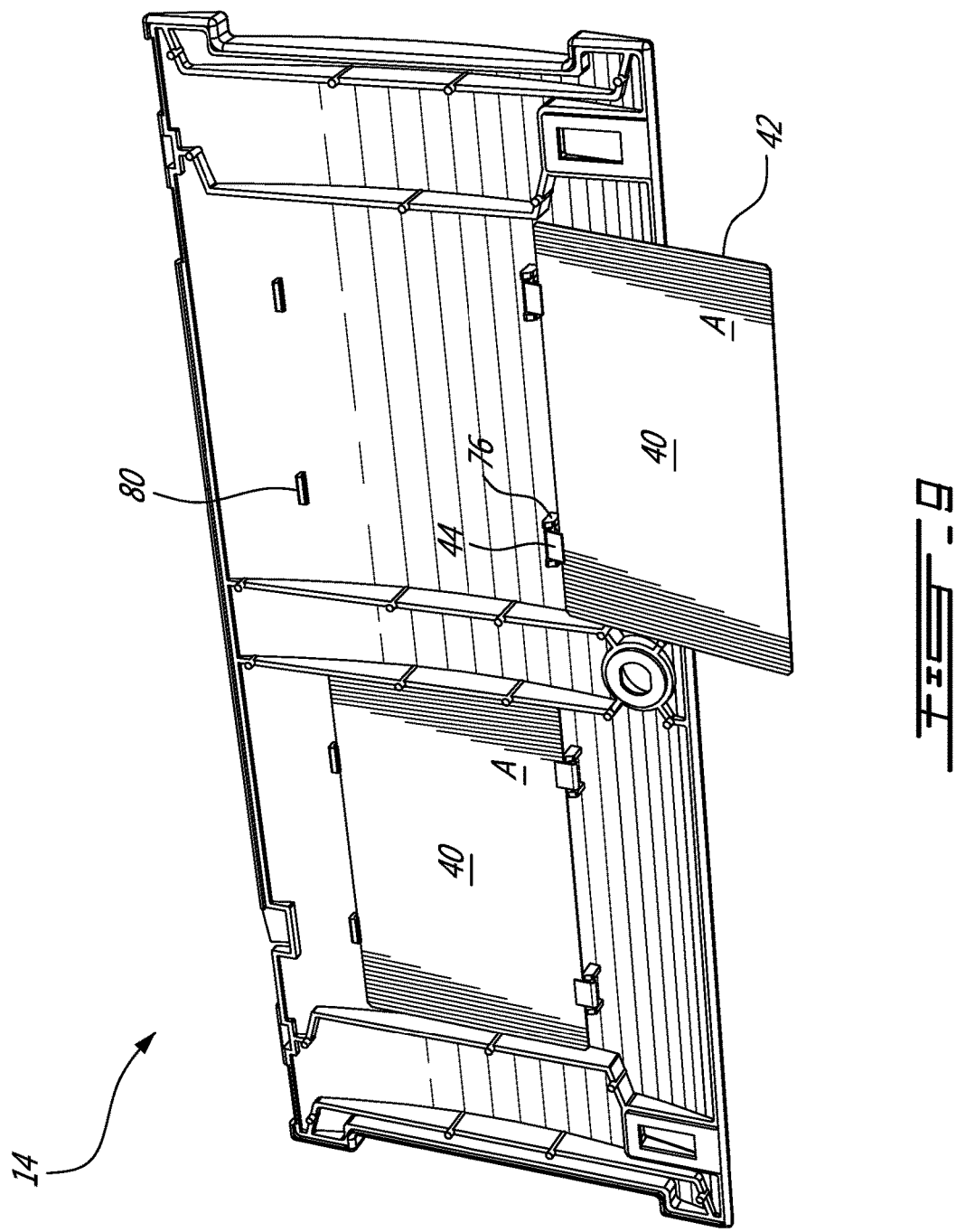

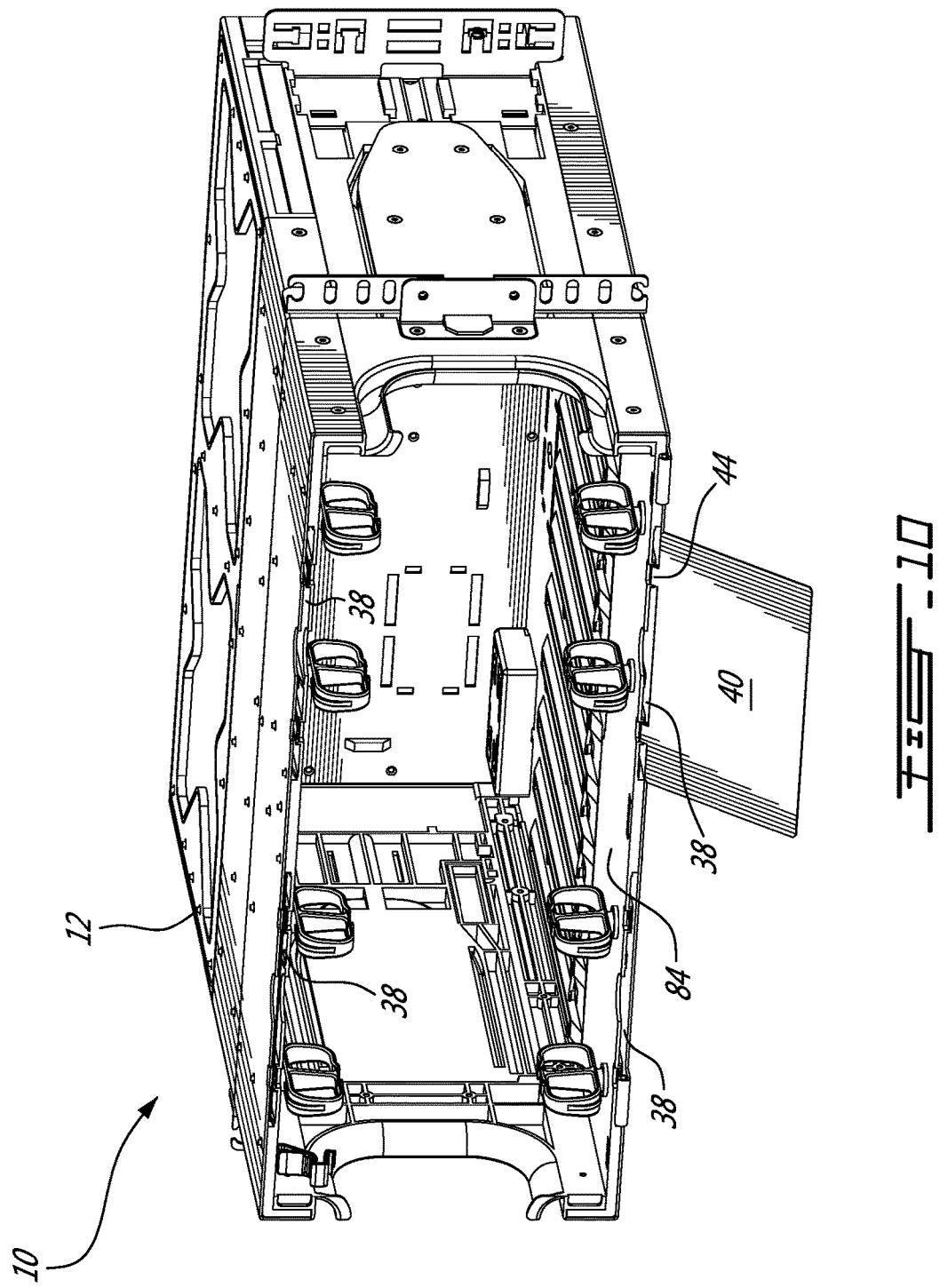

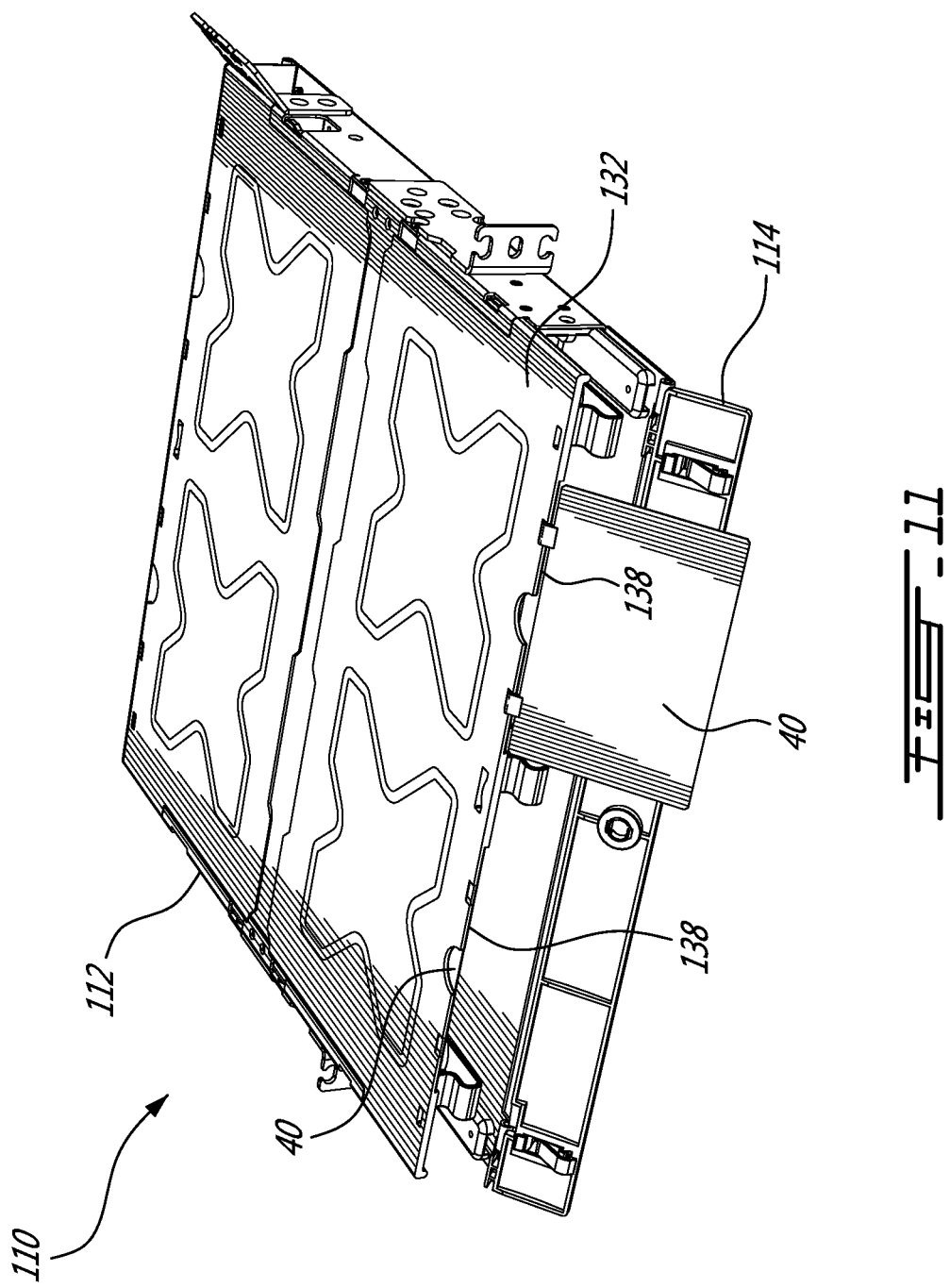

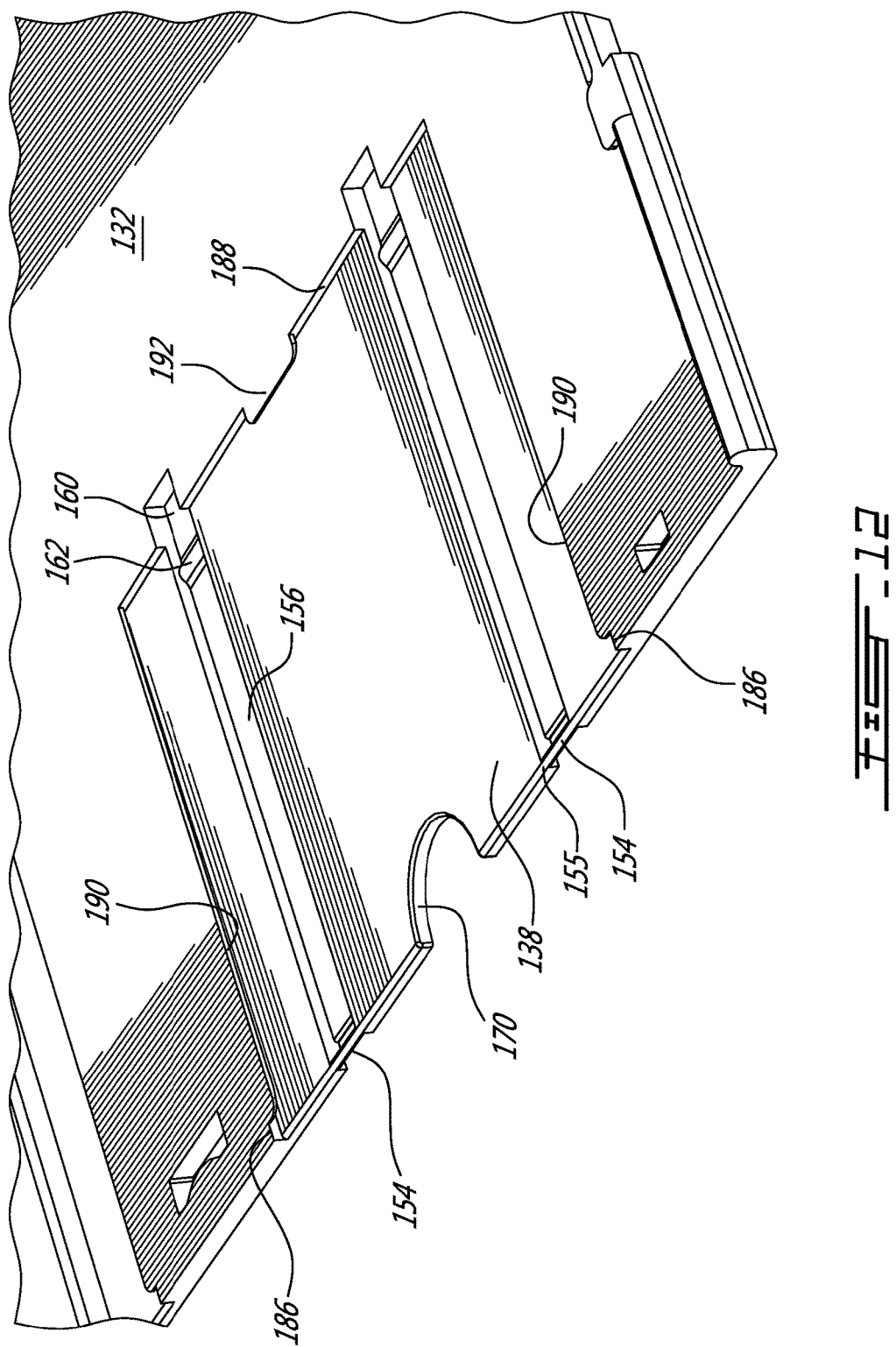

LABELLING SYSTEM FOR RACKMOUNT CASE FOR THE ACCOMMODATION OF OPTICAL EQUIPMENT

CROSS REFERENCE TO RELATED APPLICATIONS

This application claims benefit under 35 U.S.C. § 119(e) of U.S. provisional application Ser. No. 62/358,753 filed on Jul. 6, 2016 which is incorporated herein in its entirety by reference.

FIELD OF THE INVENTION

The present invention relates to a labelling system for a rackmount case for the accommodation of optical equipment. More specifically, the present invention is concerned with a labelling tag member for a rackmount case.

BACKGROUND OF THE INVENTION

Rackmount cases for optical equipment in the field generally accommodate numerous fiber-optic cables or connections. It is an object of the invention to allow a user of such a rackmount case to easily label and comprehend the organization of cables or connections, in particular without the need to manipulate them.

SUMMARY OF THE INVENTION

In order to address the above and other drawbacks there is provided a rackmount case for the accommodation of optical equipment. The case comprises a box like housing comprising an end defining a substantially rectangular housing opening, at least one labelling tag each comprising a rectangular tag plate and a plurality of first hinge elements arranged along a first edge of said rectangular tag plate, and at least one labelling tag receiving slot within said housing for removeably receiving one of said at least one labelling tag and comprising a slot opening adjacent said housing opening and a plurality of second hinge elements adjacent said slot opening. The at least one labelling tag is moveable between a stowed position, wherein said labelling tag is held substantially entirely within said slot, and a viewing position wherein said labelling tag is substantially entirely outside of said slot and each of said first hinge elements is engaged by a respective of said second hinge elements such that said labelling tag is rotatable about a hinge axis in parallel to said slot opening.

There is also provided a labelling tag for use with a rackmount case for the accommodation of optical equipment, the case comprising an end defining a substantially rectangular housing opening and at least one labelling tag receiving slot within the housing for removeably receiving one of the at least one labelling tag and comprising a slot opening adjacent the housing opening and a plurality of second hinge elements adjacent the slot opening. The labelling tag comprises a rectangular labelling tag plate for receiving a piece of readable information and sized to be received within the slot via the slot opening, and a first hinge element adapted to engage with the least a second hinge element for hingedly connecting the tag member to the rackmount case.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a perspective view of a rackmount case in accordance with a first embodiment of the invention;

FIG. 2 is a perspective view of a labelling tag of the first embodiment;

FIGS. 3 and 4 are detailed perspective views of a slot of the rackmount case for the labelling tag;

FIGS. 5 and 6 illustrate a movement of the labelling tag relative to a housing of the rackmount case;

FIGS. 7, 8 and 9 provide perspective views of a door of the rackmount case of the first embodiment in different positions;

FIG. 10 is a front right perspective view of a rackmount case in accordance with a second embodiment of the invention;

FIG. 11 is a raised front right perspective view of a rackmount case in accordance with a third embodiment of the invention; and FIG. 12 is a reversed perspective view of a top wall detailing features of a slot for a labelling tag of the rackmount case of the third embodiment.

DESCRIPTION OF ILLUSTRATIVE EMBODIMENTS

Referring now to FIG. 1, a rackmount case 10 in accordance with a first illustrative embodiment of the invention will be described. The rackmount case 10 comprises a housing 12 and a door 14 for selectively opening and closing the rackmount case 10. In FIG. 1, the door 14 is shown in an open position. The housing 12 is adapted to house optical equipment, such as a plurality of fibre optic cables. In particular, the rackmount case 10 includes means for housing and engaging a plurality of removable cassettes (not shown). Such cassettes may include further optical equipment. The rackmount case 10 also comprises a second door 16, which can comprise any or all of the features of the door 14 described herein.

Still referring to FIG. 1, the housing 12 of the rackmount case 10 comprises on each one of two side walls 18 an opening 20 for feeding through cables even when the door 14 is closed. Each opening 20 is open in direction to the respective door. The door 14 comprises a cutaway 22 near the opening 20, the cutaway 22 further facilitates feeding cables into the housing 12. Each opening 20 can comprise a brush-type cover (not shown) preventing dust from entering the rackmount case 10.

Still referring to FIG. 1, the side wall 18 of the rackmount case 10 comprises a flange 24 for attaching the rackmount case 10 on two uprights 26 of a rack, in particular a standard size rack for the accommodation of a plurality of rackmount cases. The door 14 additionally comprises a lock 28 and catches 30 for securing the door 14 in a closed position. The housing 12 further comprises a plurality of cable holders 31 for receiving cables (not shown) and holding them in place.

Still referring to FIG. 1, the housing 12 comprises a top wall 32 having a structural member 34 made from sheet metal and a functional member 36 made from plastic, although other materials can be used. The structural member 34 and the functional member 36 are arranged to define two slots 38 between each other, each slot 38 accommodating a labelling tag 40 received therein. The structural member 34 provides for a structural integrity of the top wall 32, whereas the functional member 36 comprises a plurality of functional features described in more detail below. However, the slot 38 could also be formed between any at least two elements or even by only one single element, as for example described further below with reference to FIGS. 11 and 12.

Referring now to FIG. 2, each labelling tag 40 comprises a tag plate 42 for receiving or containing information is provided. The information may take a variety of forms, including readable information. For the purpose of the present disclosure, the term "readable information" may refer to any information that is retrievable from or through the tag plate 42. Preferably, the tag plate 42 comprises written information or a surface adapted to receive such written information. Other examples of readable information include machine readable information; such as bar codes or QR-codes or the like. The tag plate 42 may also comprise an integrated circuit, such as a chip, storing information in a machine readable form. The tag member 40 can be made from any suitable material, such as plastic or metal. For the purpose of illustration, the labelling tag 40 comprises a first face A and a second face B, both of which can carry identical or different information.

Still referring to FIG. 2, the labelling tag 40 further comprises two first hinge elements 44 each illustratively formed as a flap/hinge knuckle. Each hinge knuckle 44 comprises a first portion 46 protruding from the tag plate 42, a second portion 48 defining a turn of the knuckle and comprising a shape of a partial cylinder suitable for receiving a hinge pin or the like, and a third portion 50 substantially parallel to the tag plate 42, wherein the second portion 48 connects the first portion 46 and the third portion 50. The first portion 46 and the third portion 50 are spaced apart to receive a hinge pin 54 in a manner discussed below in more detail, such that the hinge pin 54 can engage with the second portion 48 to allow for rotating the labelling tag 40 about the hinge pin 54.

Referring now to FIGS. 3 and 4, the slot 38 is shown in more detail, and wherein the structural member 34 of FIG. 1 is hidden to uncover the slot 38. The labelling tag 40 is shown in a stowed position when fully received within the slot 38, wherein the second face B faces upwards, i.e. the third portions 50 of each hinge knuckle 44, as shown in FIG. 2, are facing downwards. The functional member 36 defines the perimeter of the slot 38 by means of ribs 52, wherein the slot 38 matches the rectangular shape of the labelling tag 40. The structural member 34 (not visible in FIGS. 3 and 4) comprises a flat shape in the area of the slot 38, i.e. the space defined by the ribs 52 is bordered by the structural member 34 only in one plane.

As can be best seen in FIG. 4 (depicting the same view as FIG. 3 but with the labelling tag 40 removed) the functional member 36 comprises two hinge pins 54 at an open slot end, each hinge pin 54 forming a second hinge element 55 for engaging with the hinge knuckle 44 of the labelling tag 40. In particular, the hinge ping 54 can be received between a first portion 46 and a third portion 50 of a respective hinge knuckle 44.

Still referring to FIG. 4, the slot 38 comprises a guide 56 for each first hinge knuckle 44, the guide being formed by two guide ribs 58 and having a guiding direction, which is parallel to the guiding ribs 58. The hinge pin 54 is formed at and connecting the guide ribs 58 at the open slot end. At an opposite end of the slot 38, the rib 52 forms a recess 60 for receiving the hinge knuckle 44 when the labelling tag 40 is in a position, in which it is fully received within the slot 38, as for example shown in FIG. 3.

Still referring to FIG. 4, a ridge 62 is provided within the guide 56, the ridge 62 being perpendicular to the guiding direction of the guide 56. The ridge 62 is formed near the recess 60 and allows for the third portion 50 of the first hinge element 44 to snap behind the ridge 62 upon insertion of the labelling tag 40 into the slot 38. Thereby, the ridge 62 releasably holds the labelling tag 40 in the fully received position, as shown in FIG. 3.

Still referring to FIG. 4, during extraction of the labelling tag 40 from the slot 38, the labelling tag 40 is guided by the hinge knuckle 44 in the guide 56. However, the rib 52 may also serve a guiding function parallel to the guiding direction of the guide 56. Regarding the vertical direction, the labelling tag 40 is carried on the guide ribs 56 as well as on a central rib 64 and lateral ribs 66. During movement of the labelling tag 40 from its sotwed position within the slot 38 to the viewing position, the hinge pin 54 is received between the first portion 46 and the third portion 50 and, thus, engages with the first hinge element 44. The viewing position of the labelling tag 40 is illustrated in FIG. 5.

Still referring to FIG. 4, the functional member 36 comprises a plurality of beveled slopes 68 formed at the central and lateral ribs 64, 66 at the open slot ends. The beveled slopes 68 facilitate initial insertion of the labelling tag 40 into the slot 38. Further, the functional member 36 comprises a recess 70 at the open slot end for manual access to the labelling tag 40 in the fully received position, i.e. for allowing a user to manually pull the labelling tag 40 out of the slot 38. Although herein the extraction of the labelling tag 40 from slot 38 is generally referred to as pulling, an extraction motion could also be driven by pushing or any other type of force application.

FIGS. 5 and 6 further illustrate the movement of the labelling tag 40, wherein, in contrast to FIGS. 3 and 4, the labelling tag 40 is in the viewing position and no longer hidden. FIG. 5 shows the labelling tag 40 in a fully extracted viewing position, i.e. the tag plate 42 is parallel to the slot 38, to the guiding direction and to the structural member 34. The second face B faces upwards. Each hinge knuckle 44 is engaged with the respective hinge pin 54.

FIG. 6 depicts the labelling tag 40 in a rotated position infront of the housing opening. In comparison with FIG. 5, the labelling tag 40 is rotated about the hinge pin 54, wherein the angle of rotation is roughly 90°. The second face B faces in the same direction as the open slot end and the open housing end, i.e. it faces the viewer of FIG. 6. In the rotated viewing position of the labelling tag 40 as shown in FIG. 6, the tag member 40 is hanging down from the hinge pins 54 and, thereby, held in a position that allows a user to easily read any information on the second face B without having to further manipulate or manually hold the labelling tag 40.

As can be best seen in FIG. 6, similar to the recess 70 of the functional member 36 the structural member 34 comprises a recess 72 to provide manual access to the labelling tag 40 when being in the fully received position. In particular, the recesses 70 and 72 have matching shapes for allowing a user to grab the labelling tag 40 with opposing fingers.

Further, the structural member 36 comprises another recess 74 by each of the hinge pins 54. The recess 74 is shaped to allow for a vertical movement of the labelling tag 40 from the rotated viewing position shown in FIG. 6, i.e. the recess 74 allows the respective hinge knuckle 44 to pass through during an upwards movement. This vertical movement leads to the hinge knuckle 44 and the hinge pin 54 disengaging and to completely release the labelling tag 40 from the housing 12 into a removed position. The labelling tag 40 or another tag member can be installed by means of an opposite movement, i.e. by vertically aligning the hinge knuckle 44 of the labelling tag 40 with the recesses 74 and the hinge pins 54 and moving the tag member 40 downwards until the hinge knuckle 44 engage with the hinge pins 54. Subsequently, the labelling tag 40 may be rotated about the hinge pin 54 until the tag plate 42 is substantially parallel to the slot 38, i.e. until the position of the labelling tag 40 corresponds to the fully extracted position as described above and as shown in FIG. 5. Subsequently, the labelling tag 40 may be pushed into the slot 38 until the stowed position (as shown in FIG. 3) is reached.

FIGS. 7, 8 and 9 depict the door 14 in more detail, wherein two labelling tags 40 are installed on the inside of the door 14. In particular, FIG. 7 shows the door 14 from the front as it would be visible when in a closed position. The door 14 is illustratively transparent and allows for the labelling tag 40 to be viewed through it from the front. Each labelling tag 40 is engaged with its hinge knuckles 44 to respective third hinge elements 76 of the door 14. Each third hinge element 76 comprises a hinge pin 78, which can be best seen in FIG. 1 and which is similar to the hinge pin 54. The right labelling tag 40 is arranged such that the first face A faces the viewer of FIG. 7 through the transparent door 14. In contrast, the left labelling tag 40 is arranged such that the second face B faces the viewer. This illustrates that the labelling tag 40 may be attached to the door in any of the two shown positions as desired.

Still referring to FIGS. 7, 8 and 9, the door 14 further comprises a plurality of locking tabs 80 for holding a respective labelling tag 40 against an inside of the door 14. In particular, at least one locking tab 80 for each labelling tag 40 may be provided. The locking tab 80 comprises a protrusion forming a releasable snap-fit connection for an edge of the tag plate 42. When snapped in, the tag plate 42 is substantially parallel to and visible through the door 14.

Referring to FIG. 8, the inside of the door 14 is shown. In comparison to FIG. 7, the door 14 has been rotated about a door hinge 82, such that labelling tags 40 are directly visible, i.e. not through the transparent door 14. However, in this position, the respective opposite faces of the labelling tags 40 are now visible. In particular, the right labelling tag 40 faces the viewer with its second face B and the left labelling tag 40 faces the viewer with its first face A.

From the position shown in FIG. 8, the right labelling tag 40, for example, may be released from the locking tab 80 and rotated about the hinge pin 78 of the third hinge member 76 until the first face A of the right labelling tag 40 is visible again, as it is shown in FIG. 9. Thus, the information on one face of the labelling tag 40 visible through the closed door 14 can be easily made available again by the user, simply by flipping over the labelling tag 40 when the door 14 is open. However, it may be unnecessary to flip over the labelling tag 40 if the two faces of the labelling tag 40 contain identical information or different information specific to the open and closed positions of the door 14.

As it has been illustrated, the labelling tag 40 can be easily positioned in numerous different positions as desirable by a user of the rackmount case 10. It is possible to provide as many labelling tags 40 as desirable or exchange labelling tags 40 as needed. Also, the labelling tag 40 can be easily removed from the rackmount case to facilitate adding information to the labelling tag 40. Thus, the rackmount case 10 allows for storing and conveniently retrieving information on the labelling tag 40, such information preferably including information about the organization of fiber-optic cables and connections in the rackmount case 10 and the like.

The respective hinge elements may also be embodied in several different manners. For example, the first hinge element may comprise a hinge pin, wherein the second and/or third hinge elements comprise a flap or any other hinge structure being able to receive the hinge pin of the first hinge element and rotate about it.

FIG. 10 depicts a rackmount case 10 of a second embodiment of the invention. The rackmount case 10 of the second embodiment is similar to the rackmount case 10 of the first embodiment, with the exception that a door has not been installed. The rack mount case 10 comprises two further slots 38 in a bottom wall 84 of the housing 12. The bottom wall 84 is similar to the top wall as regards the design of the slots 38, although the features defining the bottom slots 38 are essentially upside down when compared to the top slots 38.

A third embodiment is shown in FIG. 11. A rackmount case 110 for accommodating optical equipment comprises a housing 112 defining an open housing end and a door 114 for selectively opening and closing the open housing end. The rackmount case 110 has a smaller height than the rackmount case 10. In particular, the rackmount case 110 has a height of 1U, whereas the rackmount case 10 has a height of 4U. The housing 112 comprises a top wall 132 having two open-sided slots 138 each for accepting a labelling tag 40, as shown in FIG. 2. Near the open housing end the top wall 132 is made of a one-piece plastic element, this element alone defining the open-sided slots 138.

Referring now to FIG. 12, a more detailed view of one of the slots 138 of the top wall 132 is provided, wherein the top wall 132 is viewed from the bottom. At an open slot end the top wall 132 comprises two hinge pins 154 forming a second hinge element 155 and for engaging with the hinge knuckles 44 of the labelling tag 40. The slot 138 further comprises a guide 156 for the hinge knuckles 44 formed as a recess as well as a recess 160 and a ridge 162 similar to the ones describes above. Also, a recess 170 for manual access to the labelling tag 40 is provided.

The slot 138 is formed in a recess of the top wall 132 and is defined in a vertical plane, i.e. parallel to the top wall 132, by two side edges 186 and a back edge 188. In the vertical direction, the slot 138 is defined by a pair of opposed protrusions 190 on respective ones of the side edges 186 and an additional protrusion 192 on the back edges 188. The protrusions 190, 192 define channels that receive edges of the tag plate 42 thereby retaining the labelling tag 40 in the slot 138 when in the stowed position and when moving between the stowed position and the viewing position.

The scope of the claims should not be limited by the preferred embodiments set forth in the examples, but should be given the broadest interpretation consistent with the description as a whole.

The invention claimed is:

1. A rackmount case for the accommodation of optical equipment, the case comprising:
   a box like housing comprised of a top plate, a bottom plate and two opposed side plates, a forward edge of each of said plates combining to define a substantially rectangular housing opening,
   at least one labelling tag each comprising a rectangular tag plate and a plurality of first hinge elements arranged along a first edge of said rectangular tag plate, and
   at least one labelling tag receiving slot within one of said forward edges for removeably receiving one of said at least one labelling tag and comprising a slot opening adjacent said housing opening and a plurality of second hinge elements adjacent said slot opening, wherein said at least one labelling tag is moveable between a stowed position, wherein said labelling tag is held substantially entirely within said slot, and a viewing position wherein said labelling tag is substantially entirely outside of said slot and each of said first hinge elements is engaged by a respective of said second hinge elements such that said labelling tag is rotatable about a hinge axis in parallel to said slot opening.

2. The rackmount case of claim 1, wherein each of said first hinge elements comprises a hinge knuckle and each of said second hinge elements comprises a hinge pin and wherein in said viewing position, said hinge pin is held within said knuckle.

3. The rackmount case of claim 2, wherein each of said slots further comprises a plurality of guides arranged at right angles to said slot opening and configured for slideably receiving a respective one of said knuckles therein and further wherein said hinge pin is positioned adjacent an outer end of said guide.

4. The rackmount case of claim 3, further comprising a ridge positioned within each of said guides towards an inner end of said guide and such that when said labelling tag is in said stowed position, said knuckle must traverse said ridge in order to move said labelling into said viewing position.

5. The rackmount case of claim 2, wherein each of said guides comprises a pair of opposed sides defined by a pair of guiding ribs.

6. The rackmount case of claim 1, wherein said at least one slot is positioned above said opening and wherein in said viewing position said at least one labelling tag is rotatable about said hinge axis into said housing opening.

7. The rackmount case of claim 1, wherein said at least one slot is positioned below said opening and wherein in said viewing position said at least one labelling tag is rotatable about said hinge axis to below said housing opening.

8. The rackmount case of claim 1, wherein said at least one labelling tag is moveable between said viewing position and a removed position wherein each of said first hinge elements are disengaged from said respective second hinge elements and such that said at least one labelling tag is free of said housing.

9. The rackmount case of claim 1, wherein said at least one labelling tag receiving slot further comprises a digit sized recess adjacent said slot opening and such that, when said labelling tag is in said first position, said labelling tag is moveable from said stowed position to said viewing position by gripping said labelling tag via said slot.

10. The rackmount case of claim 1, wherein said at least one slot is within an upper long edge of said housing opening and further comprising a rectangular door comprising dimensions substantially the same as said opening and hingedly mounted to a lower long edge of said housing opening for movement between an open position wherein an inside of said housing is accessible via said opening and a closed position wherein said door covers said opening.

11. The rackmount case of claim 10, wherein said door comprises a third hinge element adapted to be engageable with said first hinge element of the tag member, such that said labelling tag member can be selectively hingedly connected to one of said slot opening and said door.

12. The rackmount case of claim 10, wherein said door further comprises at least one locking tab and further wherein when said first hinge elements are engaged with said third hinge elements said labelling tag is moveable into a secured position wherein said labelling tag member is held flush against said door and a hinged movement of said labelling tag relative to the door is prevented by said locking tag.

13. The rackmount case of claim 12, wherein said door is transparent, and wherein when in said secured position, said labelling tag is visible through said door when said door is in said closed position.

14. The rackmount case of claim 1, wherein said at least one slot is open-sided and further comprising at least one protrusion on opposed side edges of said slot said protrusions defining a channel for receiving respective edges of said labelling tag when in said stowed position and when moving between said stowed position and said viewing position.

15. A labelling tag for use with a rackmount case for the accommodation of optical equipment, the case comprising an end defining a substantially rectangular housing opening and at least one labelling tag receiving slot within the housing for removeably receiving one of the at least one labelling tag and comprising a slot opening adjacent the housing opening and at least one second hinge elements adjacent the slot opening, the labelling tag comprising:
    a rectangular labelling tag plate for receiving a piece of readable information and sized to be received within the slot via the slot opening, and
    at least one first hinge element adapted to releasably engage with a respective one of the at least one second hinge element for hingedly connecting the tag member to the rackmount case.

16. The labelling tag of claim 15, wherein the slot comprises two of said second hinge elements and comprising two of said first hinge elements.

17. The labelling tag of claim 15, wherein each of the second hinge elements comprises a hinge pin and each of said first hinge elements comprises a knuckle.

18. The labelling tag of claim 15, wherein said written information comprises at least one of a written information, a barcode, a QR code and combinations thereof.

* * * * *